US012599918B1

(12) United States Patent
Wu

(10) Patent No.: US 12,599,918 B1
(45) Date of Patent: Apr. 14, 2026

(54) HEATABLE PORTABLE IRRIGATOR

(71) Applicant: Yong Wu, Liling (CN)

(72) Inventor: Yong Wu, Liling (CN)

(73) Assignee: Yong Wu, Liling (CN)

( * ) Notice: Subject to any disclaimer, the term of this patent is extended or adjusted under 35 U.S.C. 154(b) by 0 days.

(21) Appl. No.: 19/308,312

(22) Filed: Aug. 24, 2025

(51) Int. Cl.
*B05B 3/00* (2006.01)
*A47K 3/28* (2006.01)

(52) U.S. Cl.
CPC .............. *B05B 3/001* (2013.01); *A47K 3/288* (2013.01)

(58) Field of Classification Search
CPC ................................ B05B 3/001; A47K 3/288
USPC ........................................................... 4/420.4
See application file for complete search history.

(56) References Cited

U.S. PATENT DOCUMENTS 6,049,919 A * 4/2000 Roteman ................ A47K 3/285 4/603
6,059,143 A * 5/2000 Weir ......................... A45F 3/00 222/61
11,845,101 B2 * 12/2023 Brown ...................... B05B 1/18
2009/0076468 A1 * 3/2009 Hoffoss .................. A47K 3/288 604/310
2013/0001243 A1 * 1/2013 Quick .................... A47K 3/285 222/333
2021/0106181 A1 * 4/2021 Thomas ................. A47K 3/325

FOREIGN PATENT DOCUMENTS

CN 215016551 U 12/2021
CN 215385826 U 1/2022
CN 220344260 U 1/2024

* cited by examiner

*Primary Examiner* — Huyen D Le
(74) *Attorney, Agent, or Firm* — Nitin Kaushik

(57) ABSTRACT

Disclosed is a heatable portable irrigator, relating to the field of bathroom devices, which aims to solve the problems of no heating function and bulky size of a traditional irrigator. The irrigator adopts a split-type design, including a base, a liquid storage cavity, and a spray head module. The base is internally provided with a heater, a first battery, and a control circuit, which can heat a liquid to 38±3° C. The spray head module includes an independent battery, a water pump and a rotatable folding arm, which can extract the heated liquid and spray it out through a water outlet spray head. The spray head module is internally provided with a water volume detection system, and is automatically stopped when there is a water shortage. The base is provided with a waterproof charging port and a display screen, and the spray head module can be used independently.

10 Claims, 8 Drawing Sheets

HEATABLE PORTABLE IRRIGATOR

TECHNICAL FIELD

This disclosure relates to the technical field of bathroom devices, and in particular, to a portable irrigator with a liquid heating function and a split-type design, which is suitable for scenarios such as household daily care, outdoor travel, and post-operative rehabilitation.

BACKGROUND

Traditional portable irrigators have two core pain points in actual use:

- insufficient comfort: when there is no heating function, the liquid temperature is greatly affected by the environment, and especially in winter or in a low-temperature environment, direct contact of low-temperature liquid with the skin will cause a sense of irritation, reducing the use experience, and it is even more unfriendly to sensitive groups (such as pregnant and lying-in women and postoperative patients); and
- conflict between portability and functionality: most existing irrigators integrated with heating modules adopt an integrated design, and to accommodate the heating element and the large-capacity battery, the volume of the device usually exceeds 200 $cm^3$ and the weight is more than 300 g, resulting in poor portability; and due to the limitation of circuit design, most products need to cut off the heating and irrigation functions during charging, which cannot be used in emergencies.

Therefore, there is an urgent need in the market for an irrigation device that takes into account the heating function, portability, and use flexibility.

SUMMARY

This disclosure aims to solve the problems in the prior art that "low-temperature liquid affects comfort", "integrated heating device is bulky in size", and "cannot be used during charging", and provides a heatable portable irrigator, which achieves the following objectives through a split-type power supply and heating solution:

- precisely heating a liquid to a comfortable temperature for a human body, thereby improving the use experience; and
- optimizing the structural design to reduce the overall volume and weight, thereby enhancing portability.

This disclosure provides a heatable portable irrigator, including a base, a liquid storage cavity, and a spray head module, where the bottom of the liquid storage cavity is mounted on the top of the base, and a battery, a heater, and a control circuit are arranged in the base for heating liquid in the liquid storage cavity; the spray head module is detachably mounted on the top of the liquid storage cavity, and a water pump, a water inlet pipe, a water outlet pipe, an independent battery, and a control circuit are arranged in the spray head module; and the water pump extracts the liquid in the liquid storage cavity through the water inlet pipe, and the liquid is sprayed out through the water outlet pipe after being heated.

Further, the base further includes a first charging port, a heating button, a first PCB board, and a temperature sensor. The first PCB board is electrically connected to the first charging port, the heating button, and the temperature sensor, so as to achieve automation and precision of the heating process and avoid an error caused by manual temperature control; the circuit design is simplified through unified control logic, so that the stability of the device is improved; and the independent heating button facilitates quick operation by a user and lowers a threshold for use.

Further, a waterproof rubber plug is arranged at the first charging port. The waterproof rubber plug fits tightly with an interface when the charging port is not in use, forming a physical sealing barrier to prevent the liquid from entering the interior of the charging port.

Further, a display screen electrically connected to the first PCB board is arranged on a side edge of the base, allowing the user to intuitively grasp the heating progress and remaining power, thus avoiding blind waiting or heating interruption due to insufficient power.

Further, the top of the liquid storage cavity is connected to the bottom of the spray head module through a thread, facilitating water addition.

Further, the spray head module further includes a rotatable folding arm, the folding arm can be stored on a side edge of the spray head module, the folding arm is in communication with the water outlet pipe, and a water outlet spray head is arranged on the folding arm. The folding arm adopts a damping rotating shaft design, which can rotate 0-180° around the spray head module to adjust an angle of the water outlet spray head; when not in use, the folding arm can be attached to the groove on a side edge of the module for storage, thereby reducing space occupation; and the folding arm is hollow inside and in communication with the water outlet pipe, forming a liquid conveying channel.

Further, a second PCB board of the spray head module is electrically connected to the water pump, a water outlet button, a second charging port, and a second battery. The second PCB board serves an independent control core of the spray head module, receiving instructions (start/stop flushing) from the water outlet button to control the water pump to extract the liquid. Meanwhile, the charging and discharging of the second battery is managed to ensure that the water pump can still work independently when the water pump is disengaged from the base.

Further, the spray head module includes a bottom cover, a middle shell, and an upper cover, the middle shell and the upper cover are provided with a groove for accommodating a folding arm, and the water outlet button is arranged in the middle of the groove. The modular shell design reduces production and maintenance costs; the groove storage allows the folding arm to form an integrated whole with the module main body, avoiding collision damage to a protruding component; and the buttons are centrally positioned and easy to operate, reducing the probability of false touch.

Further, the spray head module is internally provided with a water volume detection system, and if no water or insufficient water volume is detected after the irrigator is powered on, the operation is automatically stopped and repeated startup within a short period is prohibited. The water volume detection system monitors the liquid volume in the liquid storage cavity through a liquid level sensor and transmits a signal to the second PCB board; and when a detection value is lower than a threshold, the second PCB board triggers a protection mechanism to cut off the power supply to the water pump and lock a start function.

Preferably, the base is detachably connected to the liquid storage cavity through a buckle, and after heating is completed, the base can be removed, thereby reducing the overall weight.

Compared with the prior art, this disclosure has the following advantages:

comfort improvement: precisely heated to 38±3° C., solving the problem of low-temperature liquid stimulation, which is especially suitable for winter or sensitive groups;

portability optimization: a split-type design, which is convenient to carry and is easier to use; and safety enhancement: equipped with water volume detection, low-voltage protection, waterproof design, and overheat protection, which reduces usage risks.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show merely some embodiments of this disclosure, and those of ordinary skill in the art may still derive other accompanying drawings from these accompanying drawings without creative efforts.

REFERENCE NUMERALS IN THE DRAWINGS

1. base; 11. gasket; 12. first PCB board; 13. first charging port; 14. heating button; 15. first battery; 16. heater; 17. rubber plug; 2. liquid storage cavity; 3. spray head module; 31. water pump; 32. water inlet pipe; 33. water outlet pipe; 34. second PCB board; 35. water outlet button; 36. folding arm; 361. water outlet spray head; 37. bottom cover; 371. middle shell; 372. upper cover; 373. sealing member; 38. second charging port; 39. second battery.

Through the above drawings, clear embodiments of this disclosure have been shown, which will be described in more detail in the following text. These drawings and textual descriptions are not intended to limit the scope of the inventive concept in any way, but rather to illustrate the concept of this disclosure for those skilled in the art by referring to specific embodiments.

DETAILED DESCRIPTION OF THE EMBODIMENTS

The following clearly and completely describes the technical solutions in the embodiments of this disclosure with reference to the accompanying drawings in the embodiments of this disclosure. Apparently, the described embodiments are some but not all of the embodiments of this disclosure. Based on the embodiments in this disclosure, all other embodiments obtained by those of ordinary skill in the art without making creative labor fall within the scope of protection of this disclosure.

To make the technical solutions and advantages of this disclosure clearer, the following further describes the embodiments of this disclosure in detail with reference to the accompanying drawings.

Referring to FIG. 1 to FIG. 8, a heatable portable irrigator disclosed in this disclosure adopts a split-type modular design, which is composed of a base 1, a liquid storage cavity 2, and a spray head module 3 as a whole. The base, the liquid storage cavity, and the nozzle module cooperate with a circuit to achieve liquid heating, extraction and spraying functions through mechanical connection. In an assembled state, the overall size is moderate, which can well meet the portability requirements.

Figure 1:
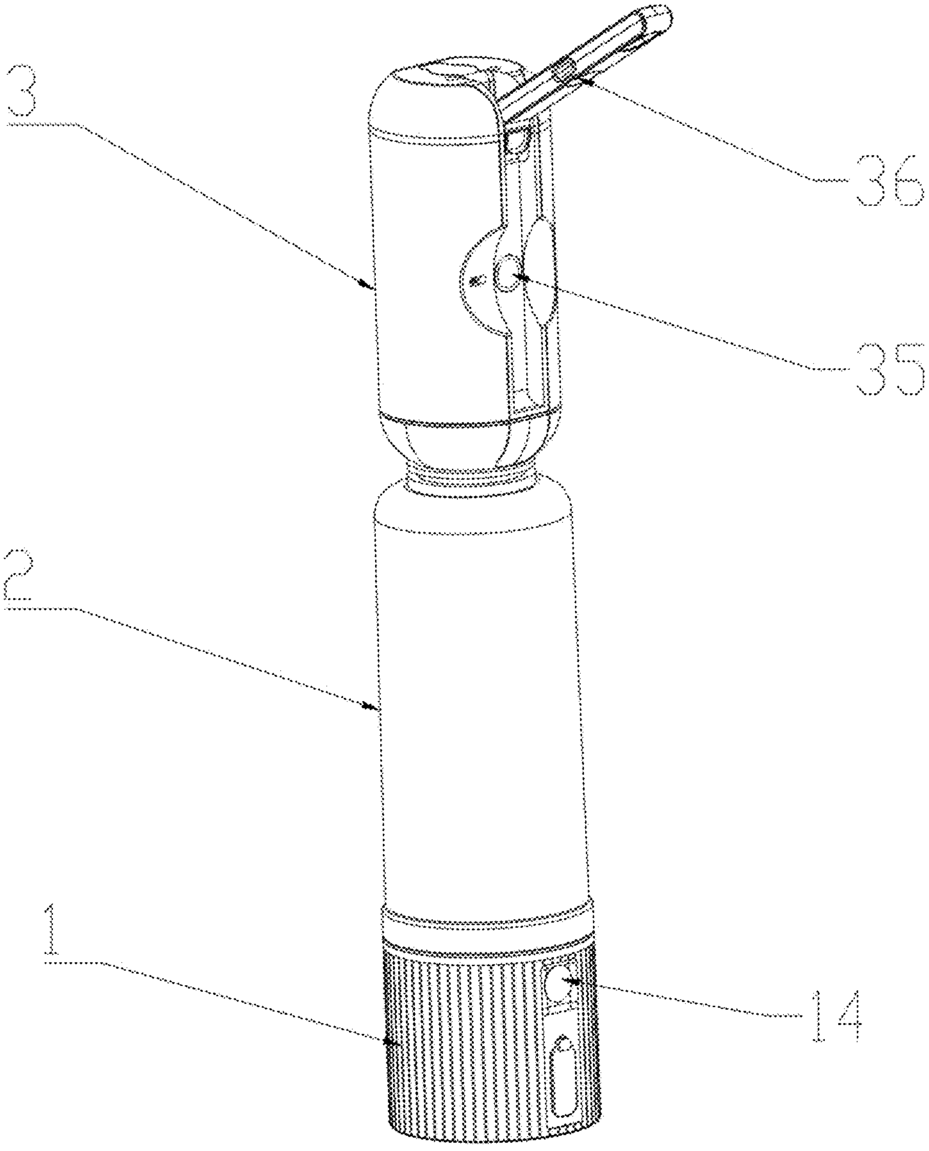
FIG. 1 and FIG. 2 are overall schematic diagrams provided by an embodiment of this disclosure.
Figure 2:
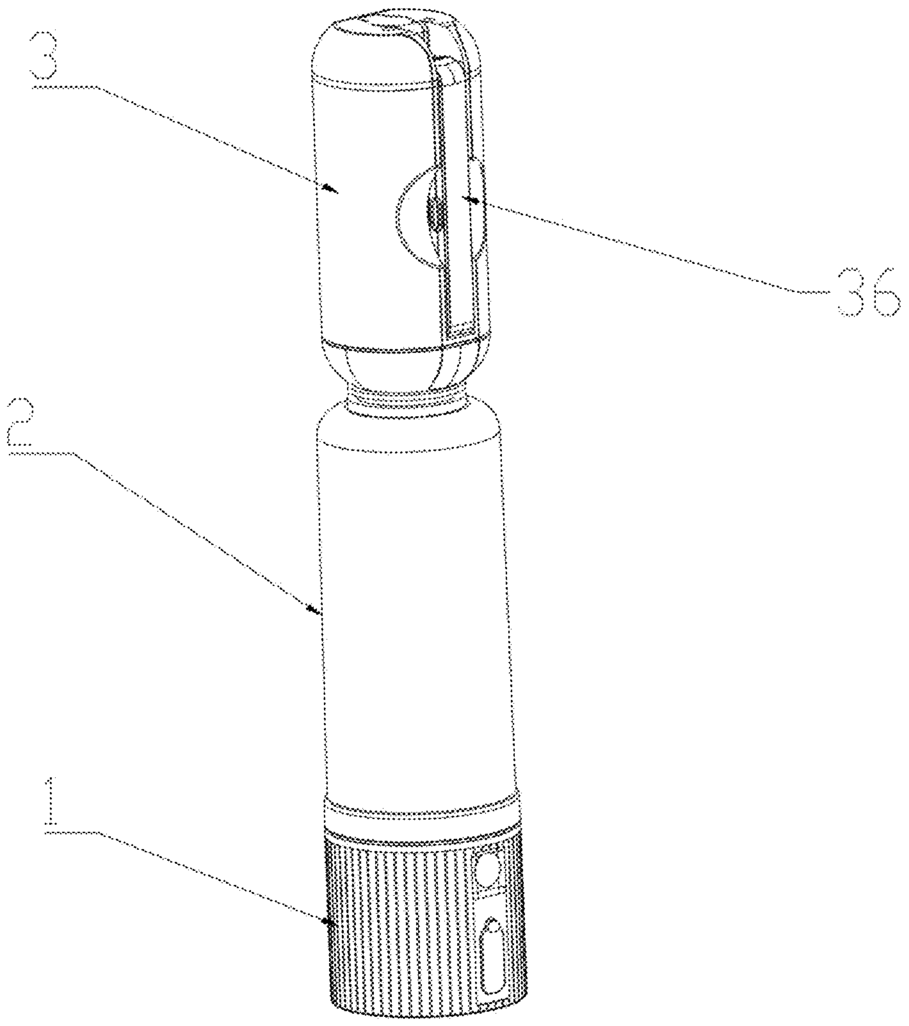
Figure 3:
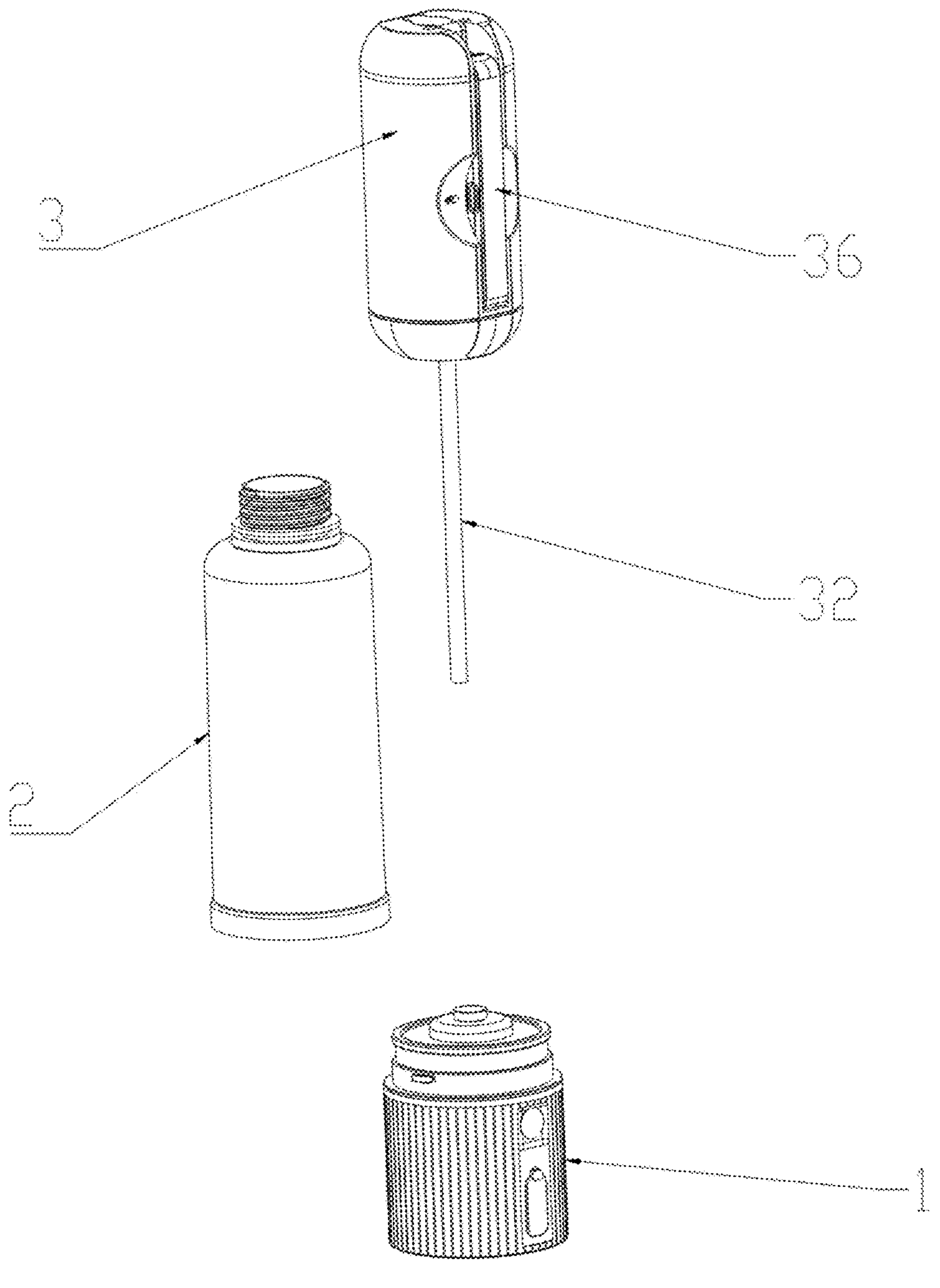
FIG. 3 is an exploded schematic diagram provided by an embodiment of this disclosure.
Figure 4:
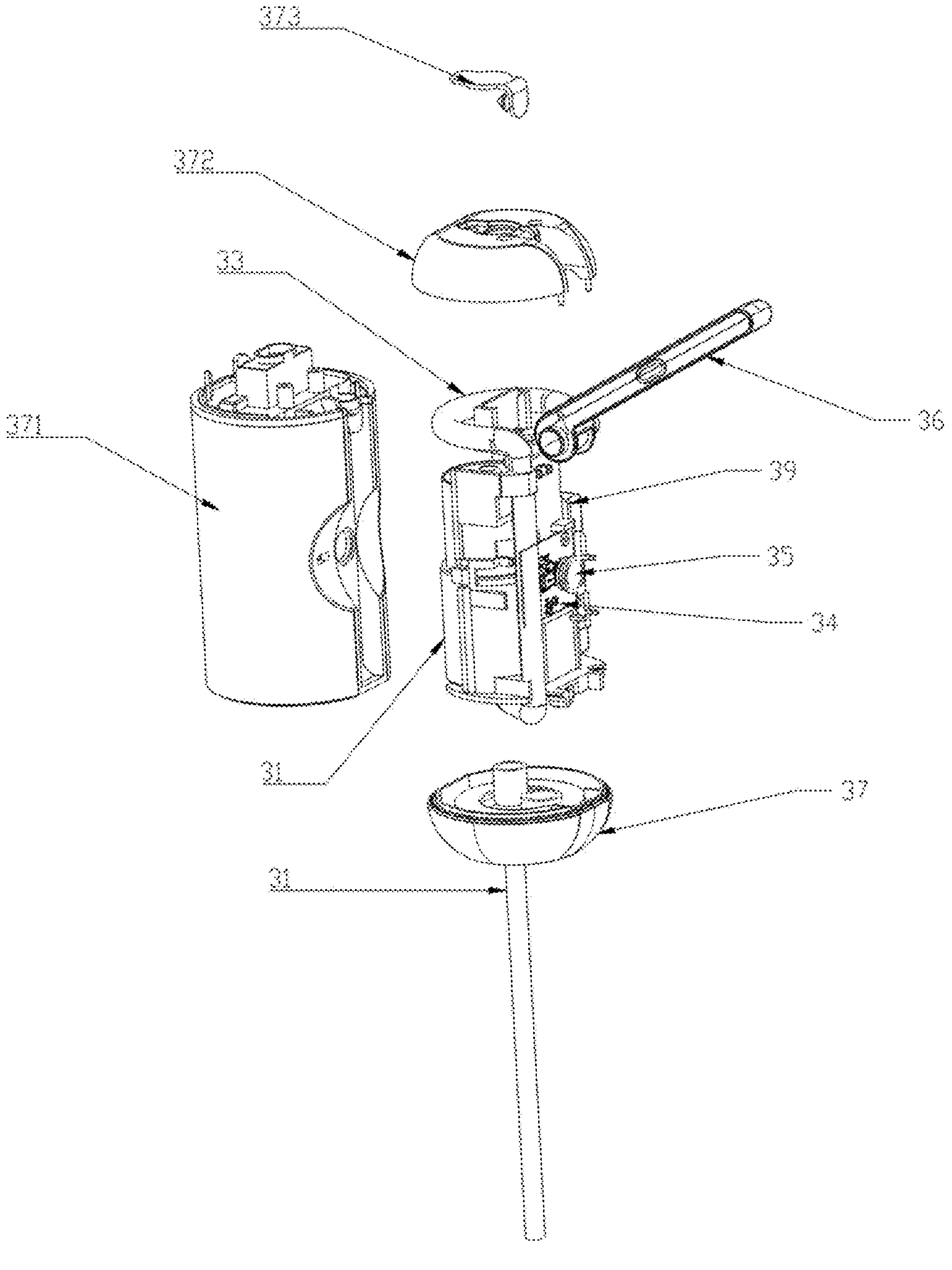
FIG. 4 is an exploded schematic diagram of a spray head module provided by an embodiment of this disclosure.
Figure 5:
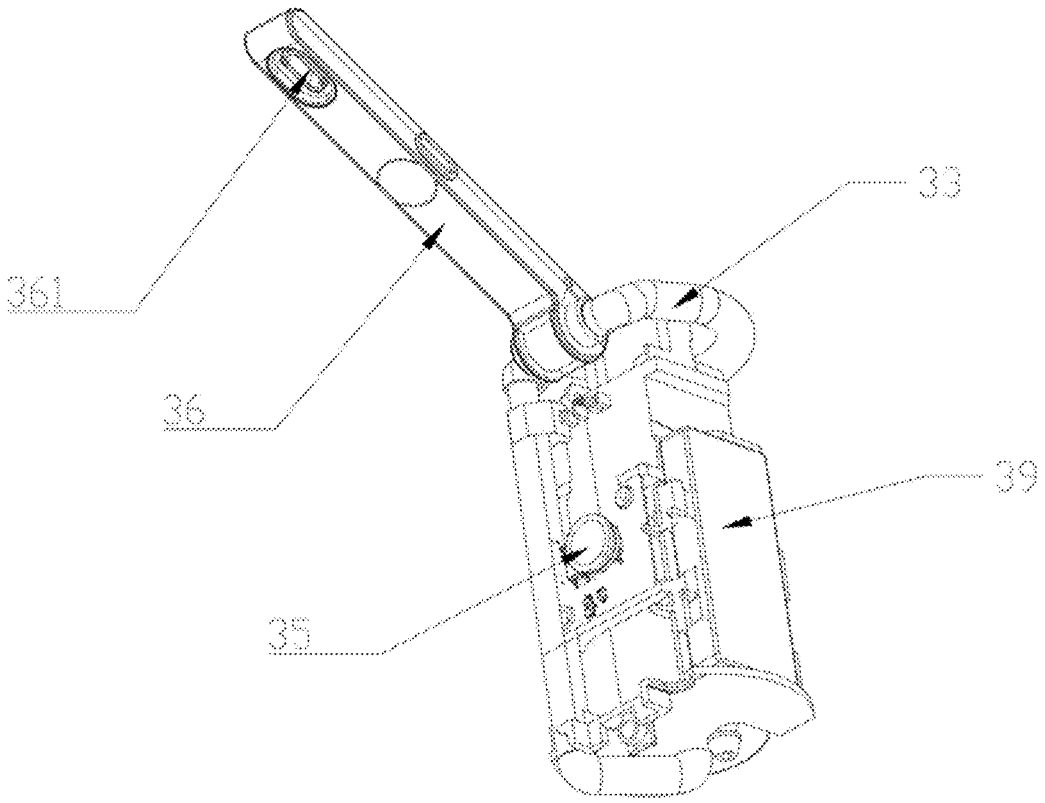
FIG. 5 is a schematic structural diagram of a spray head module provided by an embodiment of this disclosure.
Figure 6:
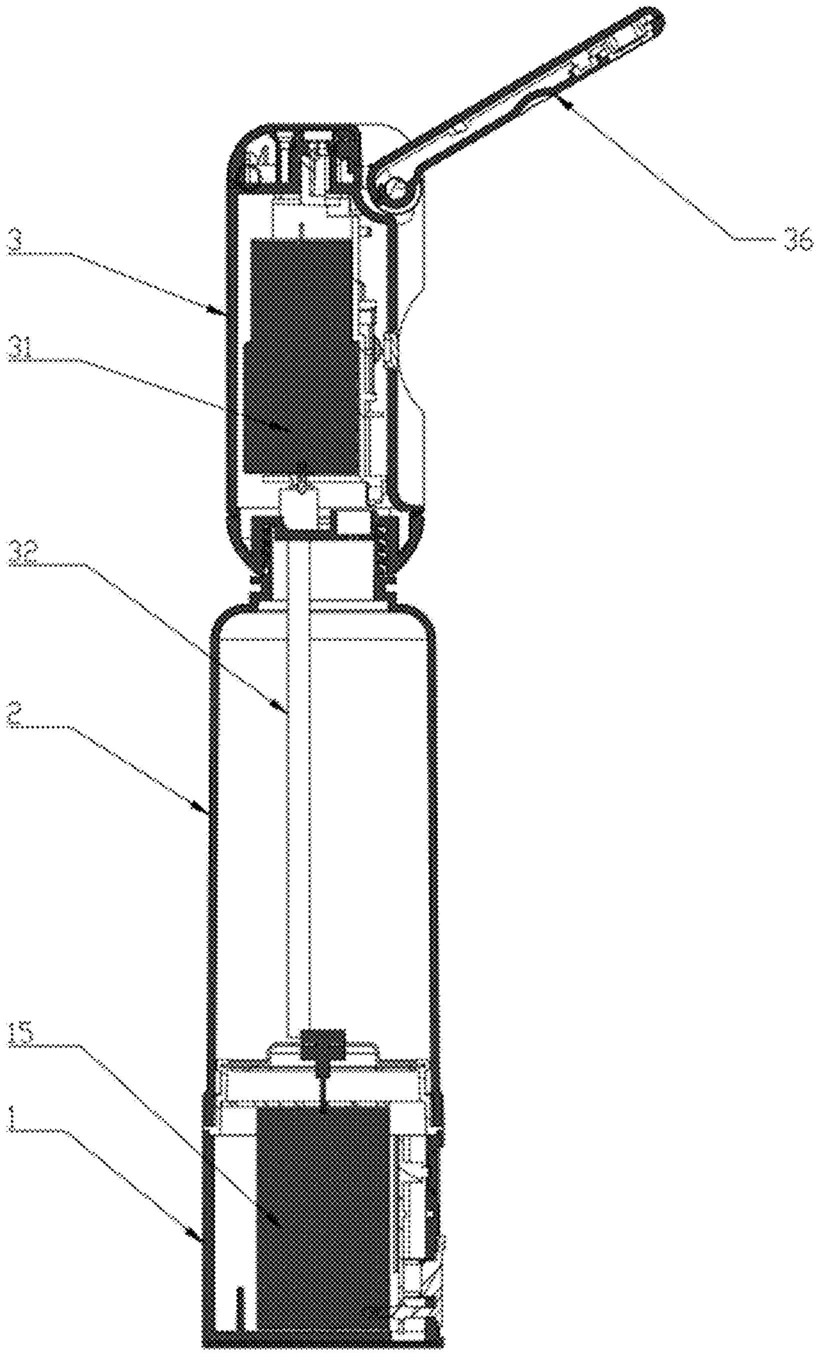
FIG. 6 is an overall cross-sectional view provided by an embodiment of this disclosure.
Figure 7:
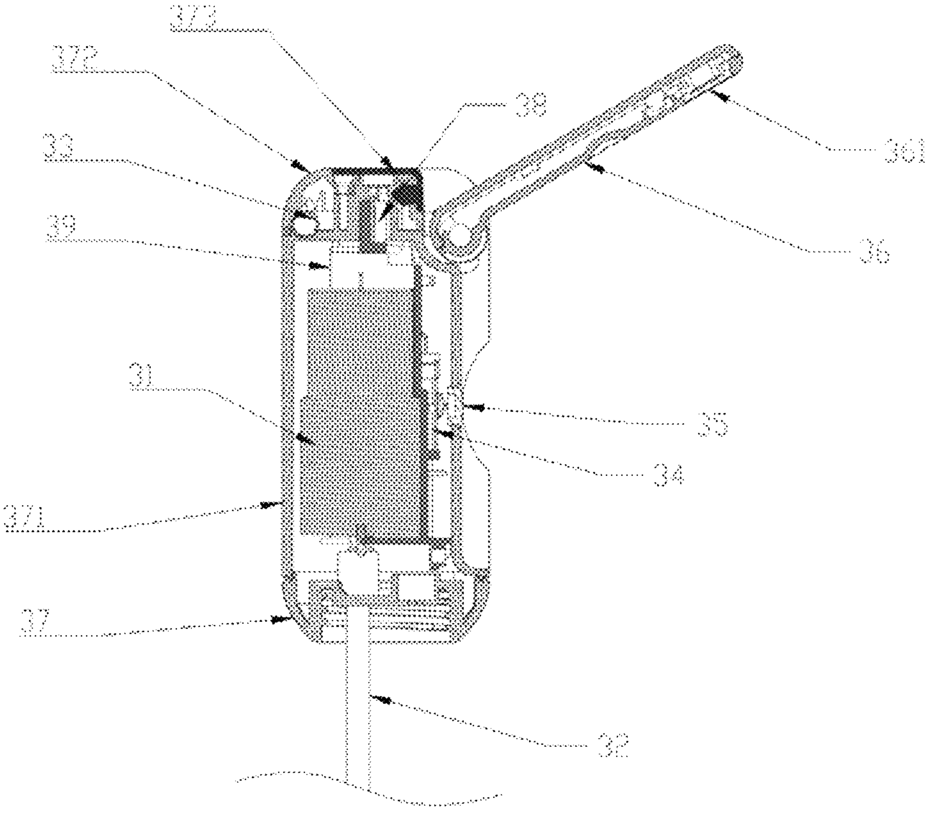
FIG. 7 is a cross-sectional view of a spray head module provided by an embodiment of this disclosure.
Figure 8:
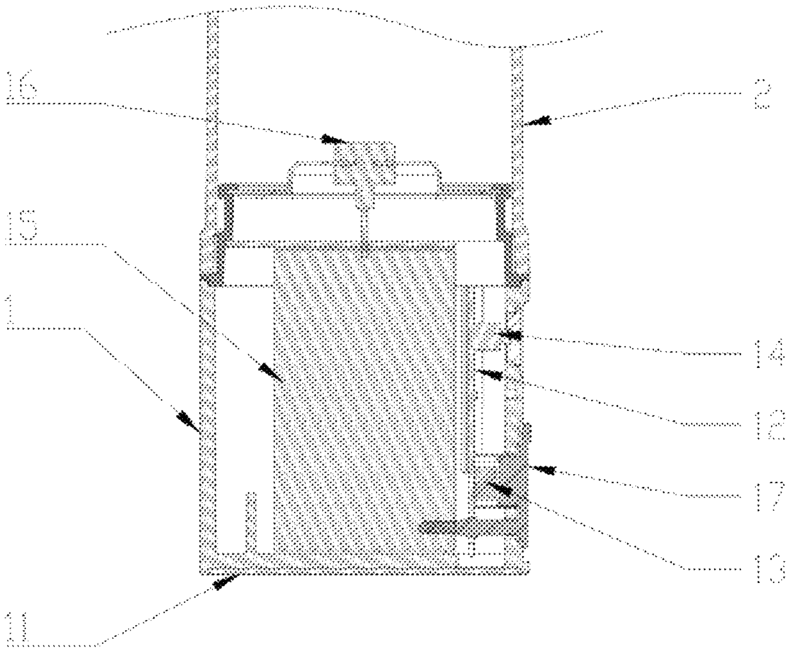
FIG. 8 is a cross-sectional view of a base provided by an embodiment of this disclosure.

As shown in FIG. 8, the base 1, as a core component for heating and power supply, carries the liquid storage cavity 2 and provides a heating function, and is internally provided with a first battery 15, a heater 16, and a control circuit; and the liquid storage cavity 2 is used for storing a liquid to be heated, is made of a food-grade material, and is attached to the base 1 through a physical structure to achieve heat conduction. As shown in FIG. 4 and FIG. 7, the spray head module 3 can independently complete the extraction and spraying of the liquid. The spray head module is internally provided with a second battery 39, a water pump 31, and a control circuit, and can be used independently after being detached from the liquid storage cavity 2. After heating is completed, the base 1 can be removed, thereby reducing the overall weight. The liquid storage cavity 2 is directly used in cooperation with the spray head module 3.

As shown in FIG. 8, the base 1 is of a cylindrical structure, and an ABS engineering plastic is used as an outer shell. A surface of the base has undergone anti-slip treatment, and a silicone gasket 11 is arranged at the bottom, which can effectively prevent sliding during placement. The first battery 15 is mounted in a groove at the bottom of the base 1 in an embedded manner, and is electrically connected to a first PCB board 12 through a nickel sheet. Meanwhile, the first battery has overcharge and over-discharge protection functions. When the voltage is lower than 3.2V, low-voltage protection is triggered, and charging is stopped when the voltage is higher than 4.2V. The heater 16 is a PTC heating sheet, and a mounting position thereof is closely attached to a contact surface at the bottom of the liquid storage cavity 2. The PTC heating sheet is physically connected to the liquid storage cavity 2 through thermal conductive silicone. After being powered on, a PTC element generates heat, and the heat is transferred to the liquid in the liquid storage cavity 2 through heat conduction. When the temperature reaches 45° C., the resistance of the PTC increases sharply to achieve self-limiting temperature, thereby preventing overheating. The core element of the first PCB board 12 includes an STM32F030 single chip microcomputer, serving as a main controller, a DS18B20 temperature acquisition chip, and a TP4056 power management chip. The main functions are to receive an instruction of the heating button 14 and a signal of the temperature sensor, control the start and stop of the heater 16, manage the charging and discharging of the first battery 15, and drive a display screen to show a device state. In this embodiment, the temperature sensor adopts an NTC thermistor with an accuracy of ±0.5° C., and is mounted on the contact surface at the bottom of the liquid storage cavity 2, so that the liquid temperature can be collected in real time. Data is transmitted to the first PCB board 12 every 0.5 seconds, and when the temperature reaches 38±3° C., a heating stop signal is triggered. The first charging port 13 supports a direct current 5V/0.5-1A input, and is equipped with a silicone waterproof rubber plug 17 at the interface, with a waterproof rating of IPX4. A charger is inserted to charge the first battery 15, and at this time, a blue light of an indicator light slowly flashes at a frequency of 1 Hz to indicate that the first battery is being charged, and the steady blue light indicates that the battery is fully charged, which takes about 2 hours for full charging. The heating button 14 is a silicone light touch button, with a three-color LED indicator light integrated at an edge of the button. A steady orange light indicates that heating is in progress, a red light flashing at a frequency of 5 times per 2 seconds indicates a low-voltage alarm, and a slow flashing or steady blue light indicates a charging state.

In some embodiments, the base 1 can be equipped with a display screen additionally to show real-time liquid temperature, power of the first battery 15, and a heating state icon. The display screen is mounted on a side edge of the base 1 in a direction perpendicular to the heating button 14.

The liquid storage cavity 2 is a transparent cylindrical container with a capacity of 200 mL, and is provided with scale marks for 50 mL, 100 mL, 150 mL, and 200 mL. The bottom of the liquid storage cavity 2 is connected to the top of the base 1 through a buckle, and a contact surface is provided with an aluminum foil layer with a thickness of 0.5 mm to enhance heat conduction efficiency. The liquid storage cavity 2 has good high temperature resistance, and can withstand long-term storage of hot water at 60° C. without deformation and odor.

In this embodiment, the water pump 31 inside the spray head module 3 is a micro DC diaphragm pump with a voltage of 3.7V, a flow rate of 150 mL/min, and a lift of 1.5 m. The water pump is fixed by a silicone shock-absorbing pad and is controlled by the second PCB board 34, and is started after receiving a signal of the water outlet button 35, and the liquid in the liquid storage cavity 2 is extracted to the water outlet pipe 33. Both the water inlet pipe 32 and the water outlet pipe 33 are made of food-grade silicone tubes. One end of the water inlet pipe 32 is connected to a water inlet of the water pump 31, and the other end of the water inlet pipe extends to the bottom of the liquid storage cavity 2; and one end of the water outlet pipe 33 is connected to a water outlet of the water pump 31, and the other end of the water outlet pipe is in communication with an internal channel of the folding arm 36. The folding arm 36 can rotate 0-180° around a rotating shaft of the spray head module 3; and the water outlet spray head 361 is located at a tail end of the folding arm 36, and the spray head can be replaced to achieve different types of spraying.

The middle shell 371 and the upper cover 372 are provided with a groove matching a shape of the folding arm 36, and the folding arm 36 can be completely embedded when being stored. The second charging port 38 is a Type-C interface, which is located at the top of the spray head module 3 and is sealed by a sealing member 373. The second PCB board 34 is equipped with an STM8S003 single chip microcomputer, which is responsible for receiving a signal of the water outlet button 35 and water volume detection system data, and controlling the start and stop of the water pump 31 as well as the charging and discharging of the second battery 39; and the water outlet button 35 is located in the middle of the groove, supporting single press to start, press again to stop, or press for 2 seconds to lock to prevent false touch. The water volume detection system adopts an infrared geminate transistor sensor, and a transmitting end and a receiving end are respectively mounted on two sides of a connection surface between the liquid storage cavity 2 and the spray head module 3. When the liquid is below a threshold of 50 mL, the refraction path of infrared light changes, the signal strength at the receiving end decreases, and the second PCB board 34 determines it as "insufficient water volume". When it is detected that the water volume is insufficient, the power supply to the water pump 31 is cut off immediately, the water outlet button 35 is locked at the same time, cannot be started again within 30 seconds, and a 1-second prompt tone is emitted at a frequency of 2 kHz through a built-in buzzer.

The circuit control system of this disclosure is divided into a base 1 control loop and a spray head module 3 control loop, which operate independently and achieve functional collaboration through mechanical connection. In the heating control process, when the power of the first battery 15 is ≥10%, the device is in a standby state, and the display screen shows the current ambient temperature and the power; the heating button 14 is pressed for 2 seconds, the first PCB board 12 drives the heater 16 to be powered on after receiving the signal, and the orange LED lights up to start heating; the temperature sensor feeds back data every 0.5 seconds, the single chip microcomputer compares a target value of 38±3° C. in real time, and when the temperature reaches 35° C., the power of the heater 16 is reduced from 15 W to 5 W to avoid overheating; and when the temperature reaches 41° C., the power supply to the heater 16 is immediately cut off, and the orange LED goes out, or the user presses the heating button 14 for 2 seconds to forcibly stop heating. In the flushing control process, after the spray head module 3 is connected to the liquid storage cavity 2, the water volume detection system will automatically start and enter a 10-second detection window period; if it is detected that the water volume is sufficient, the water pump 31 is in a to-be-started state, and at this time, the water outlet button 35 is pressed, and the second PCB board 34 drives the water pump 31 to work, so that the liquid is sprayed out from the water outlet spray head 361 through the water inlet pipe 32, the water pump 31, and the water outlet pipe 33; the water outlet button 35 is pressed again, so that the water pump 31 stops working; and if it is determined that the water volume is insufficient in the detection window period, the buzzer will give a prompt, and at the same time, the button is locked for 30 seconds.

During actual use, the operation in different scenarios is slightly different. For daily household use, the liquid storage cavity 2 is filled with clean water first, and is connected to the base 1. The heating button 14 is pressed for a while to start heating, and the display screen shows a temperature change in real time. After the temperature reaches 38±3° C., the spray head module 3 is connected to the liquid storage cavity 2, and the base is removed. The folding arm 36 is rotated as needed to adjust the angle, and the water outlet button 35 is pressed to perform flushing. After use, components are disassembled, and the components are wiped clean with a dry cloth and stored. For the post-operative rehabilitation groups, when in use, the temperature can be adjusted to a suitable range, and a comfortable flushing angle is found by rotating the folding arm 36. The water volume detection system can prevent idling of the water pump 31 caused by insufficient liquid, thereby ensuring safe use.

According to this disclosure, through a reasonable structural design and circuit control, an effective combination of heating function, portability, and use safety is achieved. The material selection of each component complies with the requirements of food safety and durability, and the operation process is simple and intuitive, which can meet the usage requirements of various scenarios such as household, outdoor, and post-operative care.

After considering the specification and practicing this disclosure, those skilled in the art will easily come up with other embodiments of this disclosure. The present application is intended to cover any variations, uses, or adaptations of this disclosure that follow the general principles of this disclosure and include common knowledge or customary technical means in the art that are not disclosed in this disclosure. The specification and embodiments are only considered exemplary, and the true scope and spirit of this disclosure are indicated by the above claims.

It should be understood that this disclosure is not limited to the precise structure described above and shown in the accompanying drawings, and various modifications and changes can be made without departing from its scope. The scope of this disclosure is limited to the appended claims.

What is claimed is:

1. A heatable portable irrigator, comprising a base, a liquid storage cavity, and a spray head module, wherein the bottom of the liquid storage cavity is mounted on the top of the base, and a battery, a heater, and a control circuit are arranged in the base for heating liquid in the liquid storage cavity; the spray head module is detachably mounted on the top of the liquid storage cavity, and a water pump, a water inlet pipe, a water outlet pipe, an independent battery, and a control circuit are arranged in the spray head module; and the water pump extracts the liquid in the liquid storage cavity through the water inlet pipe, and the liquid is sprayed out through the water outlet pipe after being heated.

2. The heatable portable irrigator according to claim 1, wherein the base further comprises a first charging port, a heating button, a first PCB board, and a temperature sensor, and the first PCB board is electrically connected to the first charging port, the heating button, and the temperature sensor.

3. The heatable portable irrigator according to claim 2, wherein a waterproof rubber plug is arranged at the first charging port.

4. The heatable portable irrigator according to claim 2, wherein a display screen electrically connected to the first PCB board is arranged on a side edge of the base.

5. The heatable portable irrigator according to claim 1, wherein the top of the liquid storage cavity is connected to the bottom of the spray head module through a thread.

6. The heatable portable irrigator according to claim 1, wherein the spray head module further comprises a rotatable folding arm, the folding arm can be stored on a side edge of the spray head module, the folding arm is in communication with the water outlet pipe, and a water outlet spray head is arranged on the folding arm.

7. The heatable portable irrigator according to claim 1, wherein a second PCB board of the spray head module is electrically connected to the water pump, a water outlet button, a second charging port, and a second battery.

8. The heatable portable irrigator according to claim 7, wherein the spray head module comprises a bottom cover, a middle shell, and an upper cover, the middle shell and the upper cover are provided with a groove for accommodating a folding arm, and the water outlet button is arranged in the middle of the groove.

9. The heatable portable irrigator according to claim 1, wherein the spray head module is internally provided with a water volume detection system, and if no water or insufficient water volume is detected after the irrigator is powered on, the operation is automatically stopped and repeated startup within 30 seconds is prohibited.

10. The heatable portable irrigator according to claim 1, wherein the base is detachably connected to the liquid storage cavity through a buckle.

* * * * *